United States Patent
Gill et al.

(10) Patent No.: US 9,474,044 B2
(45) Date of Patent: *Oct. 18, 2016

(54) 1X AND 1XEV-DO HYBRID CALL SETUP

(71) Applicant: QUALCOMM Incorporated, San Diego, CA (US)

(72) Inventors: Harleen Gill, San Diego, CA (US); Arulmozhi Kasi Ananthanarayanan, San Diego, CA (US); Eric Rosen, Solano Beach, CA (US); Ashu Razdan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,242

(22) Filed: Jan. 28, 2014

(65) Prior Publication Data

US 2014/0141817 A1 May 22, 2014

Related U.S. Application Data

(62) Division of application No. 11/360,961, filed on Feb. 22, 2006, now Pat. No. 8,706,144.

(51) Int. Cl.
| | |
|---|---|
| *H04W 68/00* | (2009.01) |
| *H04W 68/02* | (2009.01) |
| *H04W 68/12* | (2009.01) |
| *H04W 76/02* | (2009.01) |

(Continued)

(52) U.S. Cl.
CPC ............ *H04W 68/02* (2013.01); *H04W 68/12* (2013.01); *H04W 76/02* (2013.01); *H04W 68/025* (2013.01); *H04W 88/06* (2013.01)

(58) Field of Classification Search
CPC ... H04W 68/00; H04W 16/06; H04W 68/02; H04W 68/025; H04W 68/12; H04W 88/06
USPC .......................................................... 455/458
See application file for complete search history.

(56) References Cited

U.S. PATENT DOCUMENTS

| | | |
|---|---|---|
| 7,068,669 B2 | 6/2006 | Abrol et al. |
| 7,373,146 B2 | 5/2008 | Kong et al. |

(Continued)

FOREIGN PATENT DOCUMENTS

| | | |
|---|---|---|
| CN | 1722697 A | 1/2006 |
| EP | 1578156 A1 | 9/2005 |

(Continued)

OTHER PUBLICATIONS

International Report on Patentability, PCT/US07/062621, International Search Authority, The International Bureau of WIPO, Geneva Aug. 26, 2008.

(Continued)

*Primary Examiner* — Huy C HO
(74) *Attorney, Agent, or Firm* — Liem T. Do

(57) ABSTRACT

Systems and methods for hybrid call setup in a wireless communication system are disclosed. A page is sent on a first network informing a target device of a pending communication on a second network. The page also informs the target device a short data burst (SDB) will be sent on the first network. The short data burst (SDB) is sent on the first network containing setup information regarding the pending communication on the second network.

30 Claims, 7 Drawing Sheets

(51) Int. Cl.
*H04W 36/00* (2009.01)
*H04W 88/06* (2009.01)

(56) References Cited

U.S. PATENT DOCUMENTS

| | | | |
|---|---|---|---|
| 7,536,451 B2* | 5/2009 | Ahn | H04W 88/06 455/434 |
| 7,944,896 B1* | 5/2011 | Rawat | H04W 76/005 370/338 |
| 2004/0037222 A1 | 2/2004 | Kim et al. | |
| 2004/0120283 A1 | 6/2004 | Rezaiifar et al. | |
| 2004/0185879 A1 | 9/2004 | Kong et al. | |
| 2004/0219940 A1 | 11/2004 | Kong et al. | |
| 2005/0002345 A1 | 1/2005 | Pyo et al. | |
| 2005/0208965 A1 | 9/2005 | Nakajima | |
| 2006/0182069 A1 | 8/2006 | Yu | |
| 2007/0197234 A1 | 8/2007 | Gill et al. | |

FOREIGN PATENT DOCUMENTS

| | | |
|---|---|---|
| JP | 4287436 A | 10/1992 |
| JP | 9065429 A | 3/1997 |
| JP | 2005269394 A | 9/2005 |
| JP | 2008532352 T | 8/2008 |
| KR | 1020040069103 | 8/2004 |
| KR | 1020040094275 | 11/2004 |
| WO | WO-2002087268 | 10/2002 |
| WO | 2006085218 A1 | 8/2006 |

OTHER PUBLICATIONS

International Search Report. PCT/US07/062621. International Search Authority. European Patent Office, Jul. 11, 2008.
Taiwanese Search report—096106497—TIPO—Jul. 15, 2010.
Written Opinion, PCT/US07/062621, International Search Authority, European Patent Office, Jul. 11, 2008.

* cited by examiner

1X AND 1XEV-DO HYBRID CALL SETUP

CLAIM OF PRIORITY UNDER 35 U.S.C. §121

The present application for patent is a divisional application of U.S. application Ser. No. 11/360,961, entitled "1× AND 1×EV-DO HYBRID CALL SETUP," filed Feb. 22, 2006, assigned to the assignee hereof, and expressly incorporated herein by reference in its entirety.

BACKGROUND OF THE INVENTION

1. Field

The present invention generally relates to communications in a wireless environment. More particularly, the invention relates to call setup in a wireless communication system.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1×EV-DO standards, for example) or TD-SCDMA.

In wireless communication systems mobile stations or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station. For example, the control channel can be used to establish traffic channels, control power levels, and the like, as is known in the art.

Additionally, since the mobile stations periodically monitor the control channel for messages/paging directed to the mobile station, the paging interval can significantly impact the system performance Typically the system responsiveness decreases as the paging interval increases. In systems with long paging intervals, the system responsiveness may not be acceptable for all applications.

In 1× and 1×EV-DO systems it is possible to page on one network to notify the access terminal of a page and data waiting on another network. For example, a 1× page can be received informing the access terminal that 1×EV-DO page is waiting. However, this process of paging on one network to notify an access terminal of a page on another network does not increase the responsiveness of the system and can further delay the receipt of the page and data waiting on the other network.

SUMMARY

Exemplary embodiments of the present invention are directed to a system and method for improved call setup time using a hybrid solution of 1× and 1×EV-DO communications in a wireless communication system.

Accordingly, an embodiment of the invention can include a method for wireless communications comprising: sending a page on a first network informing a target of a pending communication on a second network, wherein the page informs the target that additional information will be sent on the first network; and sending the additional information on the first network, wherein the additional information contains setup information regarding the pending communication on the second network.

Another embodiment of the invention may include an apparatus comprising: a node configured to receive connection request data and communication data from an application server directed to a target, wherein the node is further configured to direct the connection request data to a first network and the communication data to a second network, and wherein the first network is configured to page the target and to send a second communication containing call setup information for the second network.

Another embodiment of the invention may include a computer readable media embodying a method for hybrid call setup in a wireless communication system, the method comprising: sending a page on a first network informing a target of a pending communication on a second network, wherein the page informs the target additional information will be sent on the first network; and sending the additional information on the first network, wherein the additional information contains setup information regarding the pending communication on the second network.

Another embodiment of the invention may include an access terminal comprising: logic configured to camp on a first network to receive paging information for both the first network and a second network; logic configured to receive a page on the first network related to a communication pending on the second network; and logic configured to maintain a connection to the first network for receipt of additional information regarding a connection to the second network.

Another embodiment of the invention can include a communication system comprising: means for sending a page on a first network informing a target of a pending communication on a second network, wherein the page informs the target that additional information will be sent on the first network; and means for sending the additional information on the first network, wherein the additional information contains setup information regarding the pending communication on the second network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
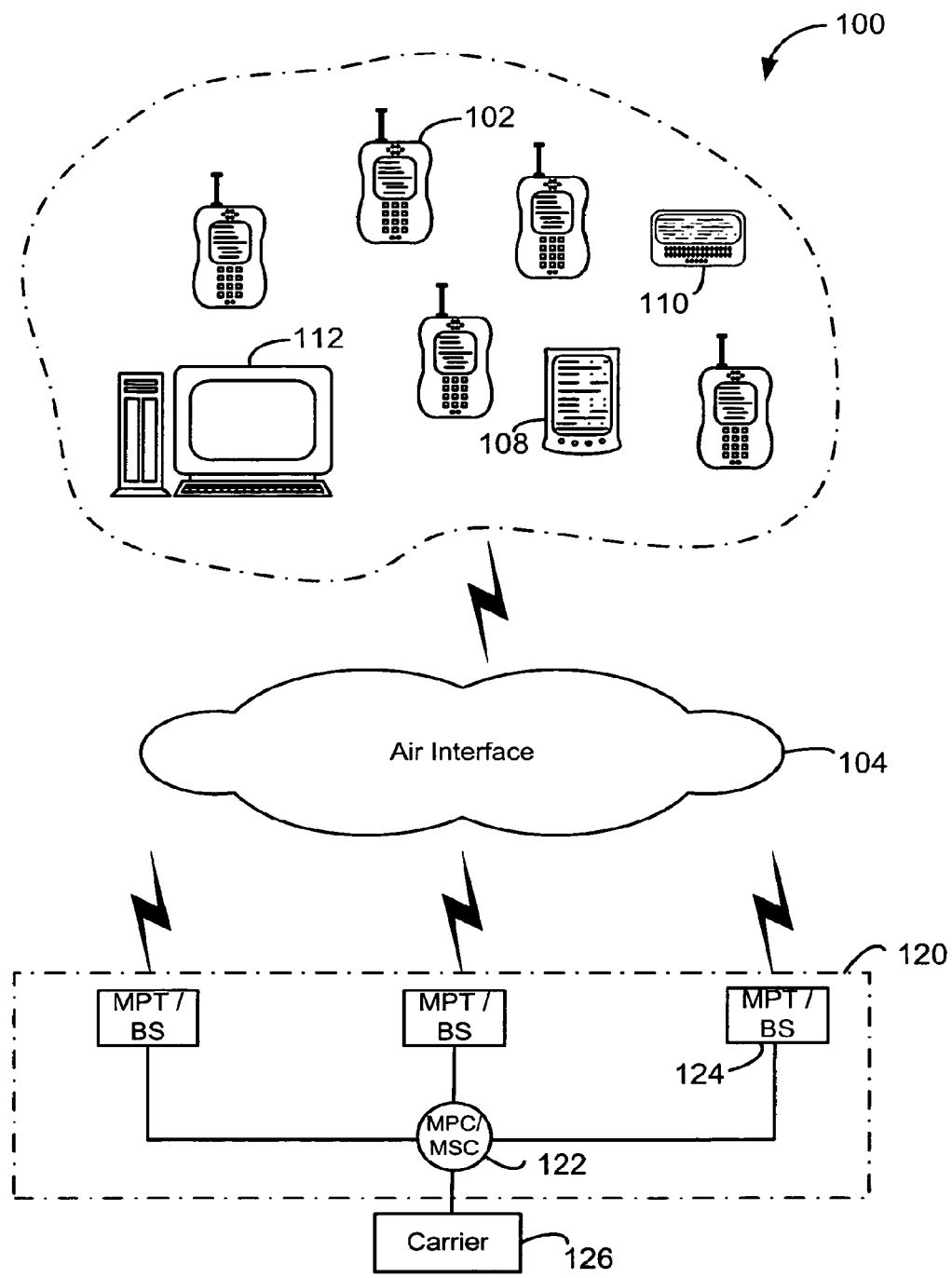
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
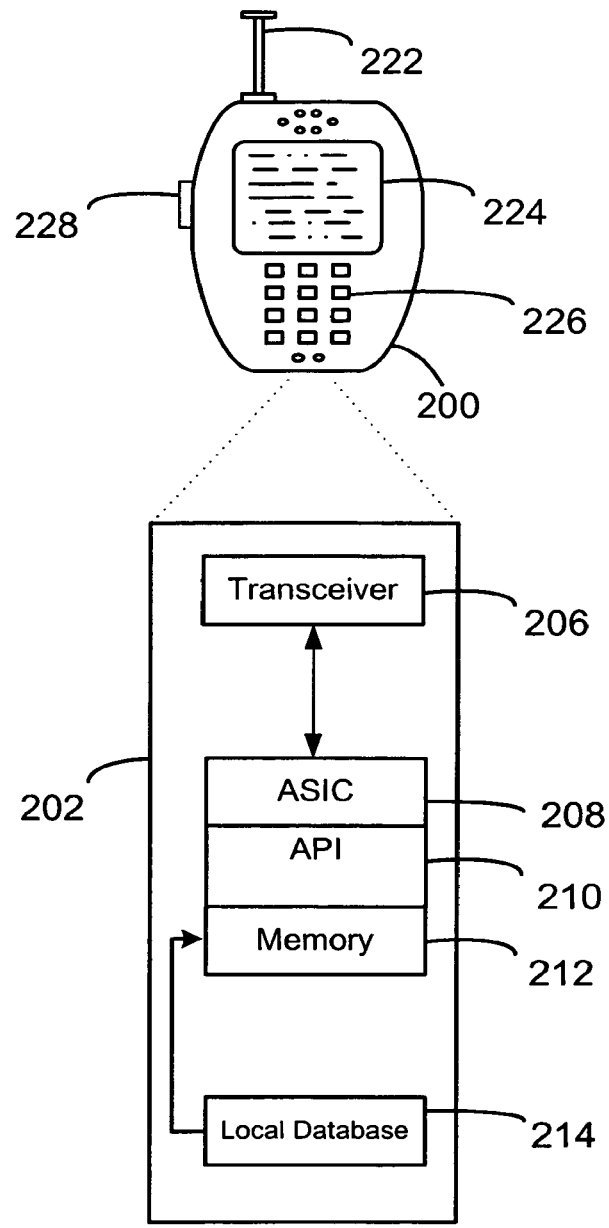
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

Accordingly an embodiment of the invention may include an access terminal comprising: logic configured to camp on a first network to receive paging information for both the first network and a second network. Upon receipt of a designated page (e.g., a special service option) additional logic configured to receive a page on the first network related to a communication pending on the second network can be activated. Then, logic configured to maintain a connection to the first network for receipt of additional information regarding a connection to the second network can be utilized. Further, logic configured to connect to the second network using the additional information received from the first network can be used to facilitate the connection on the second network. These aspects will be discussed in greater detail below.

As discussed above, the logic can be embodied in any combination of software and/or hardware configured to perform the described functions. For example, an application operating on access terminal 200 may include all the logic elements discussed above. Alternatively, an application may only contain selected logic elements that interact with one or more other resident applications and/or hardware elements (e.g., API layer 210, processor/ASIC 208, memory 212, and the like) containing the remaining logic to perform the functionality describe herein.

Additionally, the access terminal, such as cellular telephone 102, can have installed on it, or otherwise downloads, one or more software applications, such as games, news, stock monitors, and the like. For example, the cellular telephone 102 may receive one or more software applications downloaded from an application download server. The software applications may be stored on the local database 214 when not in use. The cellular telephone 102 or other wireless computing device may upload resident applications stored on the local database 214 to memory 212 for execution on the operating system or API 210 when so desired by the user or invoked by another program.

As used herein "access terminal" includes, for example, one or more processing circuits executing resident configured logic, where such computing devices include, for example, microprocessors, digital signal processors (DSPs), microcontrollers, or any suitable combination of hardware, software and/or firmware containing processors and logic configured to at least perform the operations described herein. Some examples of access terminals or wireless devices which may be used in accordance with embodiments of the present invention include cellular telephones or other wireless communication units, personal digital assistants (PDAs), paging devices, handheld navigation devices, handheld gaming devices, music or video content download units, and other like wireless communication devices.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN.

As discussed in the background, paging can be used to notify an access terminal (e.g., wireless device) that a communication directed to that terminal is available. Typically, the access terminal monitors a non-traffic channel (e.g., control channel) to check for paging directed to the access terminal. When an access terminal receives the paging information, a traffic channel can then be established between the access terminal and radio access network (RAN).

Since wireless devices are typically resource limited in terms of power, it is advantageous to set the wireless device into a low power, idle state or sleep mode, as is known in the art. However, entering a sleep mode will typically increase the delay for receiving paging information from the RAN, which can degrade the overall responsiveness of the wireless device and wireless communication. For example, access terminals in standard 1xEV-DO Release 0 ("EV-DO") operate with a 5.12 second paging interval during a sleep mode. The 5.12 second paging interval is comprised of twelve 426.66 ms Control Channel Cycles (CC Cycle). During session configuration the RAN can map the wireless device to one of these 12 Control Channel Cycles so that it may page the mobile on a 5.12 second boundary. While the standard 5.12 second paging interval is adequate for many applications, it is far too long for delay sensitive applications.

Additionally, access terminals can monitor other networks such as a 1x-RTT ("1x") network for pages, which can have a faster paging interval than the EV-DO network. For example, the paging interval on a 1x network can be on the order of 80 ms to 160 ms. Accordingly, a single access terminal may monitor multiple channels to receive data and voice paging information. Although it may be necessary in conventional systems for a single access terminal to monitor multiple networks (e.g., 1x and EV-DO), this may lead to increased delay times, increased power consumption, and the possibility of missed pages due to overlapping page cycles and the like. Accordingly, a hybrid solution can direct the access terminal to monitor pages on one network to decrease the response time and reduce the likelihood of missed pages.

Figure 3:
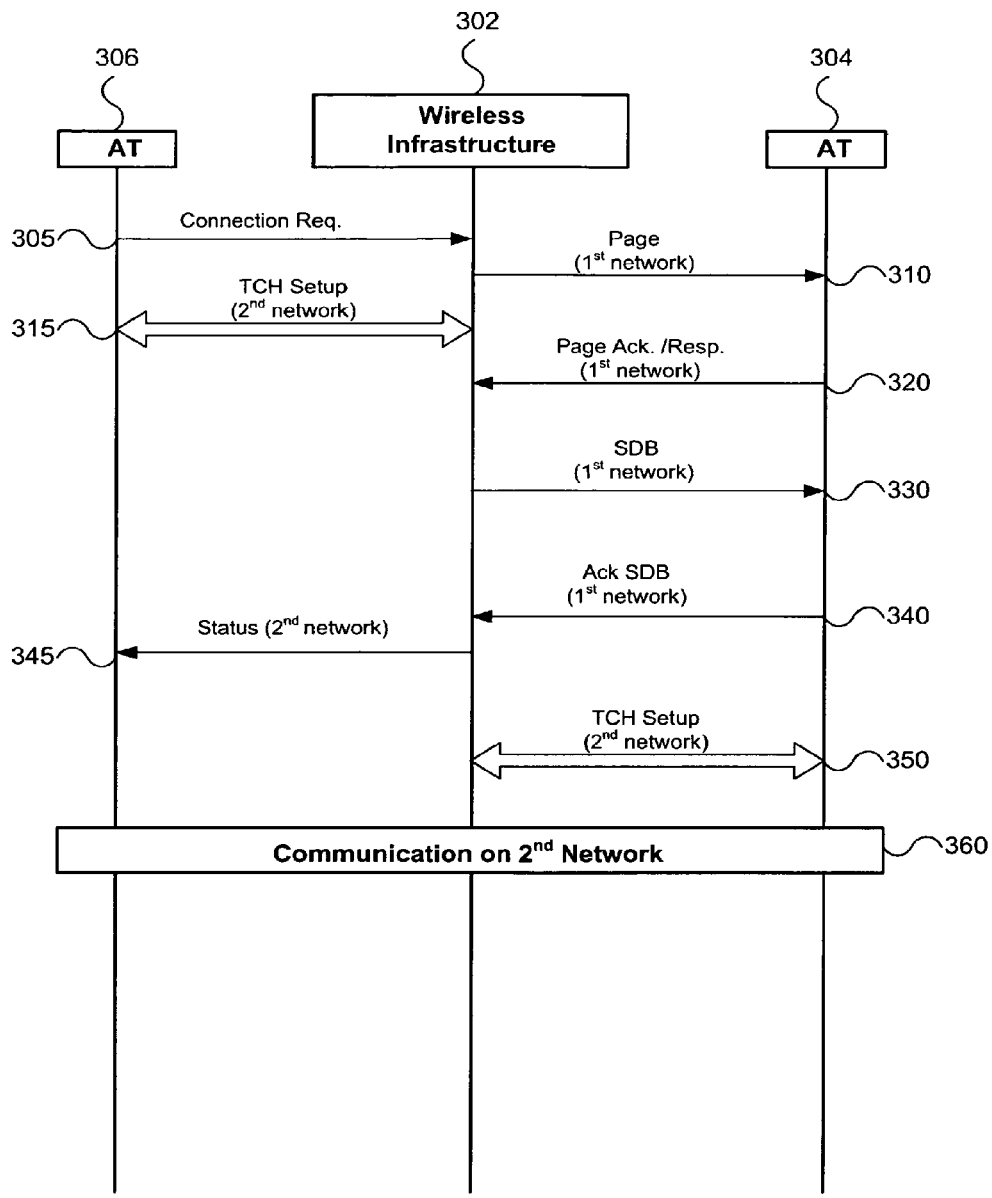
FIG. 3 is a communication flow diagram in accordance with at least one embodiment of the invention.

For example, as illustrated in FIG. 3, wireless infrastructure 302 can send a page 310 on a first network (e.g., 1x) to inform a target device (e.g., AT) 304 that a communication is pending for it on a second network (e.g., EV-DO), but to wait for additional information on the first network. Target device 304 can acknowledge the page 320. Then, the wireless infrastructure 302 can send a short data burst (SDB) 330 containing the additional information to the target device 304. The target device 304 then acknowledges the SDB 340. The target device 304 proceeds to setup a traffic channel (TCH) on the second network 350 and communicate on the second network. For example, as discussed above, the second network can be an EV-DO network which can provide high speed communications to and from the target device 304. The page, SBD and acknowledgements can be sent on the first network, such as 1x, that can provide a faster page cycle. The SBD can include call setup and/or other information that can facilitate establishing the communication link on the second network. Accordingly, a hybrid call setup solution can be realized that leverages advantageous features from both networks.

The short data burst (SDB) messages, such as provided in "TIA/EIA/IS-2000 Standards for CDMA2000 Spread Spectrum Systems," for example, may be sent over both dedicated physical channels, such as the forward fundamental channel (FCH) or forward dedicated common control channel (F-DCCH), or common physical channels, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available physical layer channel. Because SDB messages may carry arbitrary IP traffic and may be sent over common physical channels, SDB messages provide a mechanism to exchange group call signaling when a calling client's access terminal has no dedicated traffic channels.

Additionally, as illustrated in FIG. 3, the page 310 to the target device 304 may be sent in response to a connection request 305 from an originator 306. For example, the originator 306 sends a connection request 305, to the wireless infrastructure 302 and then establishes a traffic channel on the second network, 315. The originator 306 can then wait for an acknowledgement 345 that the connection request was received by the target 304. Then, the communication 360 between the originator 306 and target 304 can begin on the second network.

The originator can be an access terminal (AT) 306 as illustrated or any other device that can initiate a connection request 305 to the wireless infrastructure 302. For example, the originator can be a remote server, group communication server, application server, media server, operatively coupled to the wireless infrastructure 302 or included in the wireless infrastructure 302 itself. Further, any system that can utilize reduced connection setup time can utilize embodiments of the present invention.

A group communication system is an example of a delay sensitive system that can take advantage of reduced connection times offered by the hybrid communication setup disclosed herein. The group communication system may also be known as a push-to-talk (PTT) system, a net broadcast service (NBS), a dispatch system, or a point-to-multipoint communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102, 104, 106, 108, and 112. The ATs may be wireline or wireless devices such as terrestrial wireless telephones, wireline telephones having push-to-talk capability, satellite telephones equipped with push-to-talk functionality, wireless video cameras, still cameras, audio devices such as music recorders or players, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example AT 102, the request may be transmitted over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network RAN 120. However, the requests may also be transmitted through the public switched telephone network (PSTN) to a carrier network 126. The carrier network 126 may receive the request and provide it to distributed network 120.

Figure 4:
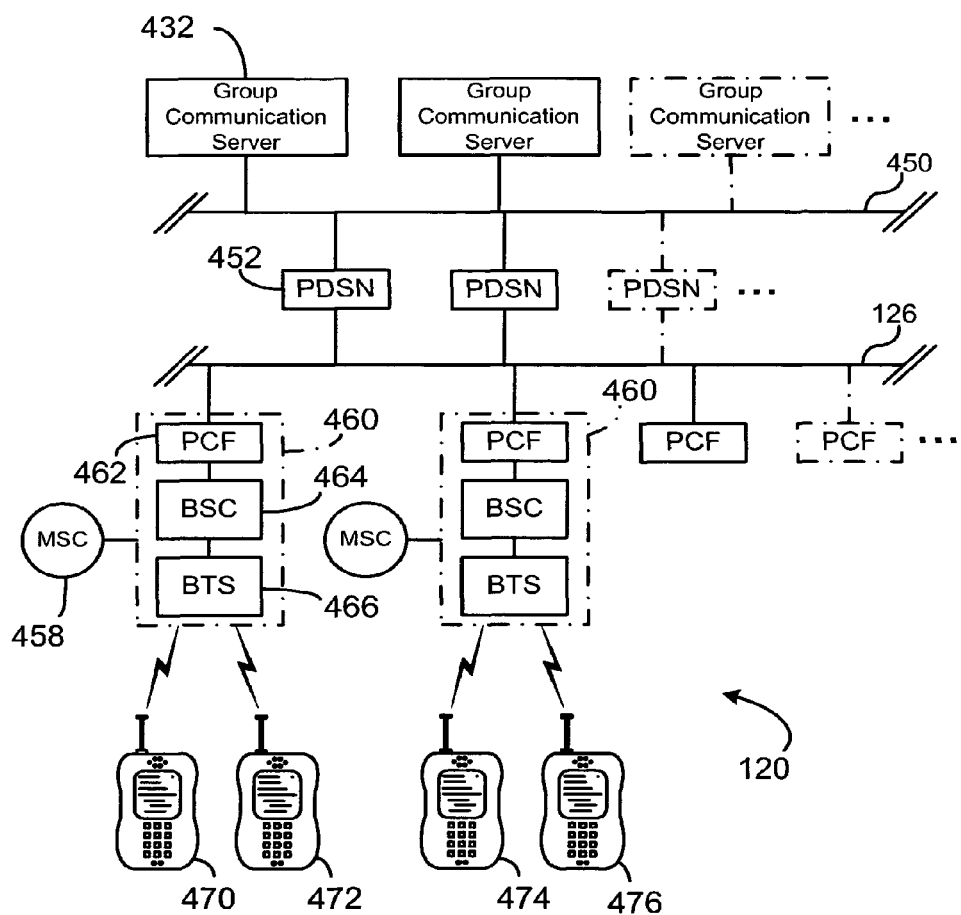
FIG. 4 is a diagram of a group communication network architecture in accordance with at least one embodiment of the invention.

Referring to FIG. 4, one or more group communication servers 432, can monitor traffic of the group communication system through its connection to distributed network 120. Since group communication server 432 can be connected to the distributed network 120 through a variety of wired and wireless interfaces, geographic proximity to group participants is not necessary. Typically, a group communication server 432 controls communications between the wireless devices of set group members (ATs 470, 472, 474, 476) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 432 can be connected to a group communication server LAN 450.

The group communication server(s) 432 can be connected to a wireless service provider's packet data service node (PDSN) such as PSDN 452, shown here resident on a carrier network 126. Each PSDN 452 can interface with a base station controller 464 of a base station 460 through a packet control function (PCF) 462. The PCF 462 may be located in the base station 460. The carrier network 126 controls messages (generally in the form of data packets) sent to a MSC 458. The MSC 458 can be connected to one or more base stations 460. In a similar manner to the carrier network, the MSC 458 is typically connected to the BTS 466 by both the network and/or Internet for data transfer and PSTN for voice information. The BTS 466 ultimately broadcasts and receives messages wirelessly to and from the wireless ATs, such as cellular telephones 470, 472, 474, 476, as is well known in the art. Accordingly, the details of a group communication system will not be further discussed.

Figure 5:
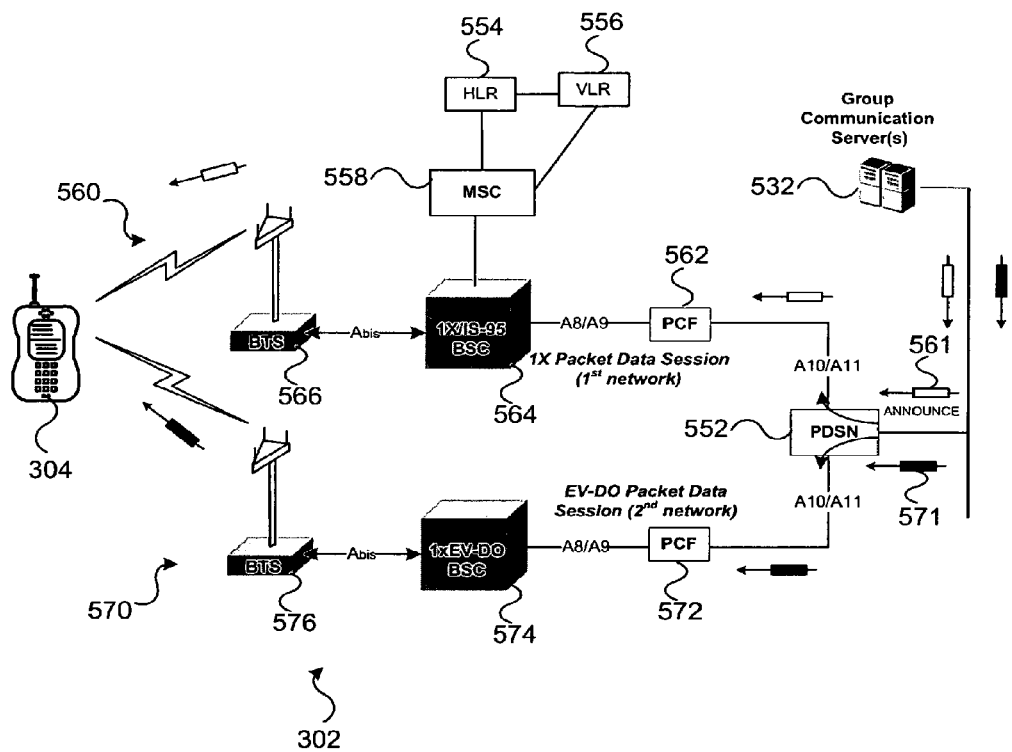
FIG. 5 is a diagram of a group communication network architecture illustrating two network connections in accordance with at least one embodiment of the invention.

Referring to FIG. 5, a system level diagram of an embodiment of the invention is illustrated. For example, wireless infrastructure 302 can include group communication server(s) 532, PDSN 552, home location register (HLR) 554, visitor location register (VLR) 556, MSC 558, PCFs 562 and 572, BSCs 564 and 574, and BTSs 566 and 576. Each of these elements may be used to provide voice and/or data to AT 304. For example, as illustrated in FIG. 5, AT 304 can be connected to two networks 560 and 570 (e.g., 1× and EV-DO) for communicating over packet data sessions. As discussed in the foregoing, the first network 560 can be used to page (e.g., announce 561) the target device 304 informing the target device 304 of a communication pending 571 on the second network 570. In addition, the page 561 informs the target device 304 that additional information to facilitate the call setup on the second network 570 will follow on the first network 560.

The PDSN 552 can receive data (e.g. a connection request from group communication server 532) and direct the data to a first network 560 to page the target device 304. The data can include call setup information for a second network 570. For example, PDSN 552 can deliver the data to the 1× network 560 (e.g., PCF 562, BSC 564, BTS 466, MSC 558, HLR 554, and VLR 556). The 1× network 560 can send a page to the target device 304 to locate the target device. The 1× network can then send a SBD containing connection setup information for the second network to the target device 304. Accordingly, system bandwidth is conserved because the SDB is not broadcast to multiple BSCs/BTSs. However, since additional information will be sent on the first (1×) network, the page is coded or identified (e.g., using a special service option and/or software on the target device) such that the target device remains on the first network to receive the second communication (e.g., SDB).

The target 304 can be "camped" on the first network 560 to receive pages for both the first network 560 and second network 570. As used herein the term "camped" refers to a device predominantly monitoring one network for information. However, a camped device may still periodically monitor the second network for overhead information and the like. Once the target device receives the page on the first network, it can send a response to the page on the first network and then remains on the first network for the second communication before connecting to the second network. Once the second communication (e.g., SBD) is complete the target 304 can use the information contained therein to facilitate the connection to the pending communication 571 on the second network. For example, a PTT call, media stream, Qualcomm's signaling protocol (QSP) data, and the like can be pending on the EV-DO network 570 and the target 304 can switch to the EV-DO network 570 and establish a traffic channel to receive the communication 571. Accordingly, the high-speed data capability of the EV-DO network can be used in combination with the rapid paging intervals of the 1× network to provide a hybrid solution for low latency high bandwidth applications.

As can be appreciated from FIG. 5, a single target can receive an announce message/page and SDB 561 on the first network (1×) 560 and additional data 571 on a second network (EV-DO) 570. Further, since AT 304 is the common target for both data communications, the same IP address may be used for each packet data session, which can improve the response time in setting up the EV-DO communication and provide transparency to devices outside the wireless network. For example, the VOIP connection would maintain the same target IP address for both the page/SBD 561 and subsequent traffic communication 571. Accordingly, the PDSN 552 or other server can be configured to direct the packets to the correct network, based on the communication being sent from an originator/application server (e.g., 532). For example, a Differentiated Services Code Point (DSCP) value can be used to identify the announce/SDB 561 from the data stream 571. However, the invention is not limited to this configuration, for example, instead of or in combination with the DSCP, a specific IP port could be used for each network, a specialized page/service option can be defined, and the like.

Figure 6:
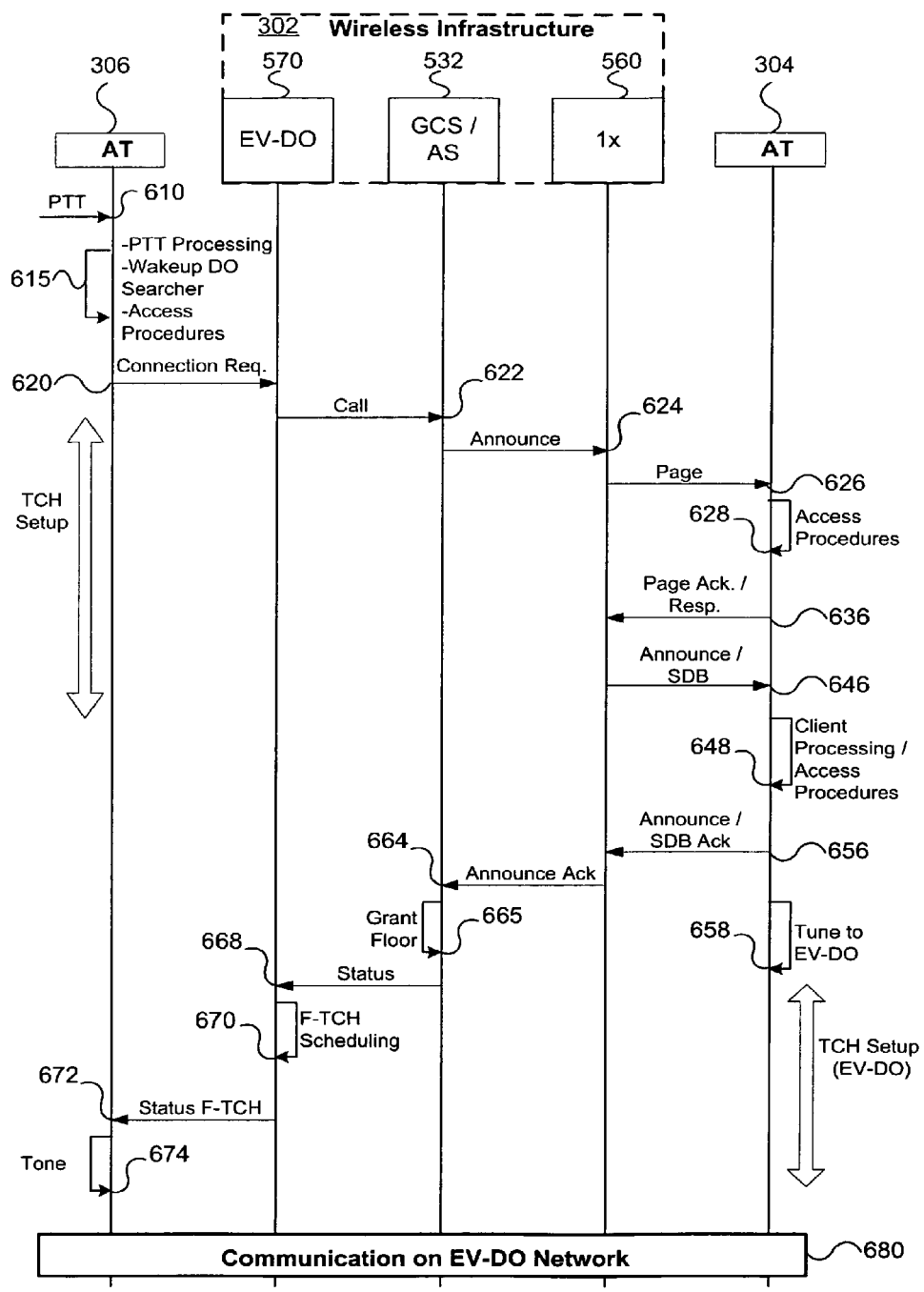
FIG. 6 is a communication flow diagram in accordance with at least one embodiment of the invention.

FIG. 6 illustrates a communication flow diagram in accordance with at least one embodiment of the present invention. Referring to FIG. 6, an originator (e.g., AT 306) can initiate a PTT session 610 to connect to a target (e.g., AT 304), for example, by depressing a PTT button or other such action. As illustrated the AT 306 can directly start the PTT processing and access procedures 615, such as waking from an idle state and starting a DO searcher to connect to the EV-DO network 570. A connection request can then be sent on the EV-DO network 570 which can relay the request 622 to a group communication server (GCS) or other such application server (AS) 532. However, those skilled in the art will appreciate that the connection request could alternatively be sent on the 1× network 560 and then AT 306 could switch to the EV-DO network 570. The GCS 532 can then send an "announce" message 624 to the 1× network 560 directed to the target 304. A page 626 can be sent from the 1× network 560 to AT 304. AT 304 receives the page 626, process the page 628 and sends back an acknowledgement 636.

As discussed previously, the page 626 informs AT 304 to stay on the 1× network for additional information regarding the pending communication on the EV-DO network 570. Upon receiving the page ack. 636, the 1× network 560 sends announce/SDB 646 to AT 304 containing additional information regarding the pending communication on the EV-DO network 570. Upon receipt of the SDB 646, AT 304 processes the information contained therein and begins access procedures for the EV-DO network, 648.

Additionally, AT 304 sends an announce/SDB ack. 656 back to the 1× network 560 and tunes 658 to the EV-DO network 570 to receive the pending communication. The announce ack. 664 is relayed back through the 1× network 560 to GCS 532. The GSC 532 can then grant the floor 665 to AT 306 (e.g., allow AT 306 to transmit on the half duplex connection). This status 668 is then relayed to the EV-DO network 570 that then opens a traffic channel 670 for communication from AT 306 and forwards the status/traffic channel information to AT 306, which can then sound a tone or other audible and/or visible indicator that communication to AT 304 can begin on the EV-DO network 570.

Figure 7:
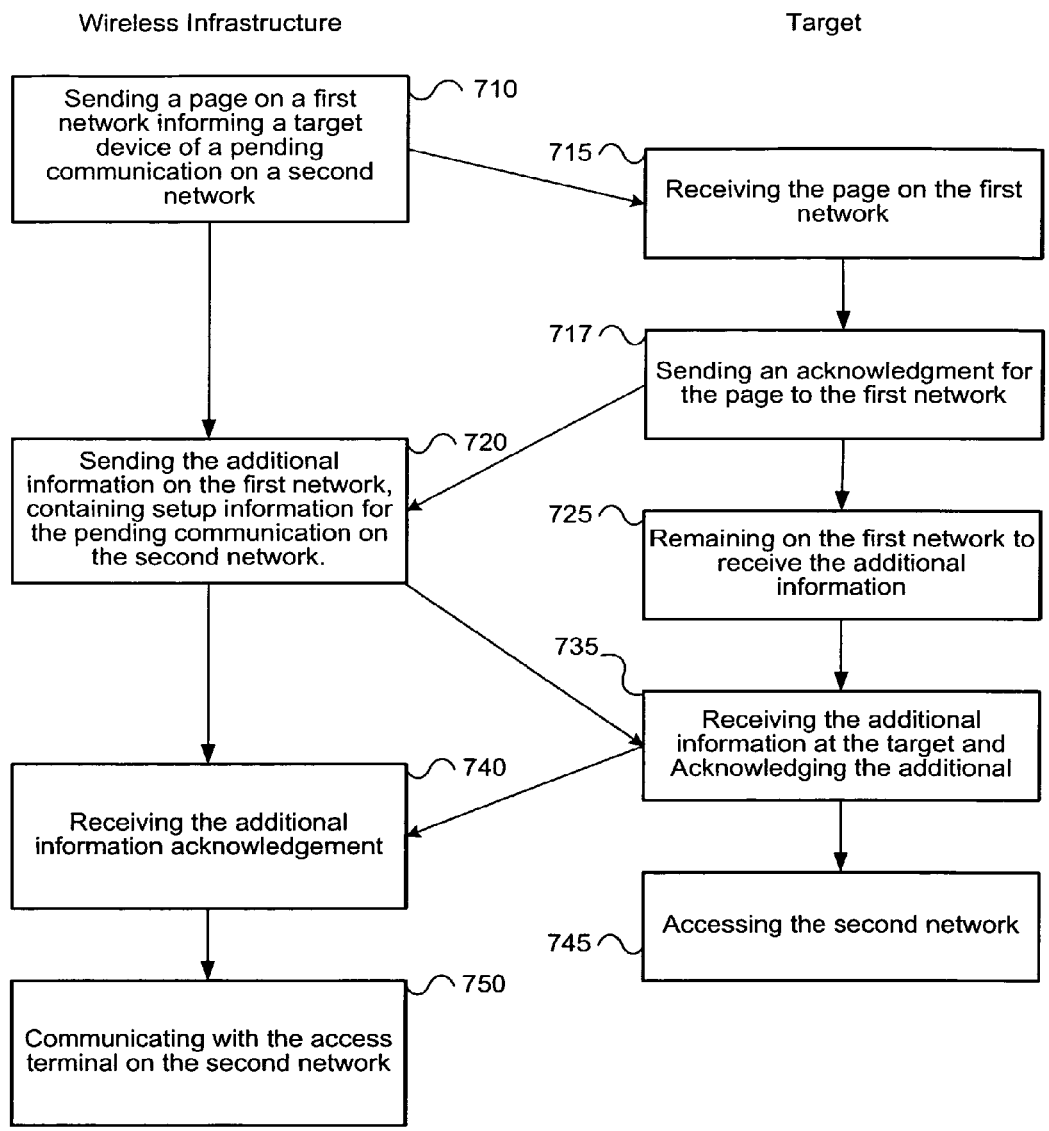
FIG. 7 is a flowchart illustrating methods in accordance with at least one embodiment of the invention.

In view of the foregoing disclosure, those skilled in the art will recognize that embodiments of the invention include methods of performing the sequence of actions, operations and/or functions previously discussed. Referring to FIG. 7, a flowchart illustrating at least one method according to embodiments of the invention is provided. For example, the method can comprise sending a page on a first network informing a target device of a pending communication on a second network 710. The page further informs the target device that additional information will be sent on the first network. Then, the additional information (e.g., SDB) can be sent on the first network 720. The additional information can contain setup information and/or general information regarding the pending communication on the second network. As further illustrated in FIG. 7, the target device may receive the page 715 and then acknowledge the page to the first network 717. Receipt of the acknowledgement 717 can be used to trigger sending the additional information 720 because the acknowledgement can allow for confirmation of the location of the target device. Then, the higher cost SDB (in terms of system loading) may only be sent to a specific sector having the target device.

Additionally, the method can further include receiving the additional information at the target and acknowledging the additional information 735. Then, the target device can access the second network using the additional information to receive the pending communication, 745. The wireless infrastructure can receive the additional information acknowledgement on the first network 740 and can begin communicating with the target on the second network 750. The communication can be between elements within the wireless infrastructure, such as a streaming media server or operably couple to the wireless infrastructure. Those skilled in the art will recognize that embodiments of the invention are not limited to the configurations and sources illustrated. Since present day wireless and wired networks can communicate over the Internet and/or other networks embodiments of the invention can include any device capable of performing the functionalities described herein.

For example, a group communication server can be used to open a half duplex communication between an originator and a target by opening a traffic channel on the second network. Accordingly, communication can be supported between an access terminal and other devices coupled to the Internet, wireless networks, private networks and the like. For example, a half-duplex VOIP connection can be supported between access terminals in a wireless to wireless and/or wireless to wireline configuration. Generally any bandwidth suitable communication can be supported. For example, using the high bandwidth available on EV-DO, streaming video and/or audio, and the like can be supported.

Further, as discussed herein, the hybrid solution can utilize multiple networks to exploit the benefits of each. For example, the first network (e.g., 1×) may have a faster paging interval than the second network (e.g., EV-DO). Also, the second network (e.g., EV-DO) may have a higher bandwidth than the first network. However, embodiments of the invention are not limited to these networks and/or configurations.

As will be appreciated by those skilled in the art, the page in the hybrid communication systems discussed herein can be sent by a wireless infrastructure in communication with the target. Further, the page can be generated in response to a connection request from an originator. The originator is not limited to another access terminal and can include for example, a remote server, group communication server, an application server, and a media server. However, in a PTT environment the originator is typically an access terminal, a wireless client device, a wireline device, a personal digital assistant (PDA), a mobile terminal or the like, operably coupled to a group communication server.

For example, as previously discussed, a push-to-talk (PTT) signal can be generated (e.g., via PTT button) at an originator sending a connection request to a group communication server. The group communication server can communicate with the first network to send the page. Additionally, the connection request can be sent on the second network, while the page can be sent on the first network.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

Accordingly, an embodiment of the invention can include a computer readable media embodying a method for hybrid call setup in a wireless communication system, in accordance with the methods, algorithms, steps and/or functions disclosed herein. For example, the method embodied in the computer readable media can include sending a page on a first network informing a target of a pending communication on a second network, wherein the page informs the target additional information will be sent on the first network; and sending the additional information on the first network, wherein the additional information contains setup information regarding the pending communication on the second network. As used herein, the page informing the target of additional information does not require that specific information be included in the page. For example, a special service option may be identified and used in combination with logic on the target device to establish that the target device will receive additional information. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for wireless communication at a base station comprising:
   sending a page on a first network to a target device, the page comprising information indicating a pending communication on a second network;
   receiving, on the first network, as a response, an acknowledgment of receipt of the page from the target device; and
   sending additional information on the first network upon receiving the acknowledgement of the page, the additional information comprising setup information for the pending communication on the second network.

2. The method of claim 1, wherein the page further comprises information indicating the additional information will be sent to the target device on the first network.

3. The method of claim 1, wherein the page is generated in response to a connection request from an originator device.

4. The method of claim 3, further comprising:
   opening a traffic channel on the second network for communication between the originator device and the target device.

5. The method of claim 1, further comprising:
   receiving an additional information acknowledgement on the first network;
   and communicating with the target device on the second network.

6. The method of claim 1, wherein the acknowledgement allows the base station to confirm a location of the target device.

7. A non-transitory computer-readable medium having encoded thereon program code for hybrid call setup in a wireless communication system, comprising:
   program code to send a page on a first network to a target device, the page comprising information indicating a pending communication on a second network;
   program code to receive, on the first network, as a response, an acknowledgment of receipt of the page from the target device; and
   program code to send additional information on the first network upon receiving the acknowledgement of the page, the additional information comprising setup information for the pending communication on the second network.

8. The non-transitory computer-readable medium of claim 7, wherein the page further comprises information indicating the additional information will be sent to the target device on the first network.

9. The non-transitory computer-readable medium of claim 7, wherein the page is generated in response to a connection request from an originator device.

10. The non-transitory computer-readable medium of claim 9, further comprising program code to open a traffic channel on the second network for communication between the originator device and the target device.

11. The non-transitory computer-readable medium of claim 7, further comprising:
   program code to receive an additional information acknowledgement on the first network; and
   program code to communicate with the target device on the second network.

12. The non-transitory computer-readable medium of claim 7, wherein the acknowledgement allows the base station to confirm a location of the target device.

13. An apparatus for wireless communication, comprising:
 a memory;
 a transceiver configured for wireless communication; and
 at least one processor coupled to the memory and the transceiver, the at least one processor configured:
  to send a page on a first network to a target device, the page comprising information indicating a pending communication on a second network;
  to receive, on the first network, as a response, an acknowledgment of receipt of the page from the target device; and
  to send additional information on the first network upon receiving the acknowledgement of the page, the additional information comprising setup information for the pending communication on the second network.

14. The apparatus of claim 13, wherein the page further comprises information indicating the additional information will be sent to the target device on the first network.

15. The apparatus of claim 13, wherein the page is generated in response to a connection request from an originator device.

16. The apparatus of claim 15, wherein the at least one processor is further configured to open a traffic channel on the second network for communication between the originator device and the target device.

17. The apparatus of claim 13, wherein the at least one processor is further configured:
 to receive an additional information acknowledgement on the first network; and
 to communicate with the target device on the second network.

18. The apparatus of claim 13, wherein the acknowledgement allows the base station to confirm a location of the target device.

19. A method for wireless communication at a wireless access terminal, comprising:
 receiving a page on a first network, the page indicating a pending communication on a second network;
 sending an acknowledgement for the page on the first network to a serving base station;
 staying on the first network to receive additional information;
 receiving the additional information comprising setup information for accessing the second network; and
 accessing the second network based on the setup information.

20. The method of claim 19, further comprising sending an acknowledgement for receipt of the additional information to the serving base station.

21. The method of claim 19, further comprising establishing a traffic channel on the second network with an originator device.

22. The method of claim 19, wherein the acknowledgement allows the serving base station to confirm a location of the wireless access terminal.

23. A wireless access terminal comprising:
 a memory;
 a transceiver configured for wireless communication; and
 at least one processor coupled to the memory and the transceiver, the at least one processor configured:
  to receive a page on a first network, the page indicating a pending communication on a second network;
  to send an acknowledgement for the page on the first network to a serving base station;
  to stay on the first network to receive additional information;
  to receive the additional information comprising setup information for accessing the second network; and
  to access the second network based on the setup information.

24. The wireless access terminal of claim 23, wherein the at least one processor is further configured to send an acknowledgement for receipt of the additional information to the serving base station.

25. The wireless access terminal of claim 23, wherein the at least one processor is further configured to establish a traffic channel on the second network with an originator device.

26. The wireless access terminal of claim 23, wherein the acknowledgement allows the serving base station to confirm a location of the wireless access terminal.

27. A non-transitory computer-readable medium at a wireless access terminal having encoded thereon program code, comprising:
 program code to receive a page on a first network, the page indicating a pending communication on a second network;
 program code to send an acknowledgement for the page on the first network to a serving base station;
 program code to stay on the first network to receive additional information;
 program code to receive the additional information comprising setup information for accessing the second network; and
 program code to access the second network based on the setup information.

28. The non-transitory computer-readable medium of claim 27, further comprising program code to send an acknowledgement for receipt of the additional information to the serving base station.

29. The non-transitory computer-readable medium of claim 27, further comprising program code to establish a traffic channel on the second network with an originator device.

30. The non-transitory computer-readable medium of claim 27, wherein the acknowledgement allows the serving base station to confirm a location of the wireless access terminal.

* * * * *